United States Patent
Kim

(10) Patent No.: US 10,206,192 B2
(45) Date of Patent: Feb. 12, 2019

(54) METHOD AND DEVICE FOR DETECTING LTE FRAME SYNCHRONIZATION, AND RELAY DEVICE APPLYING THE SAME

(71) Applicant: SOLiD, INC., Seongnam-si (KR)

(72) Inventor: Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

(21) Appl. No.: 15/106,354

(22) PCT Filed: Aug. 14, 2014

(86) PCT No.: PCT/KR2014/007589
§ 371 (c)(1),
(2) Date: Jun. 20, 2016

(87) PCT Pub. No.: WO2015/093711
PCT Pub. Date: Jun. 25, 2015

(65) Prior Publication Data
US 2016/0337998 A1    Nov. 17, 2016

(30) Foreign Application Priority Data
Dec. 20, 2013   (KR) ........................ 10-2013-0160752

(51) Int. Cl.
*H04W 56/00* (2009.01)
*H04L 5/00* (2006.01)
(Continued)

(52) U.S. Cl.
CPC ..... *H04W 56/0035* (2013.01); *H04J 11/0069* (2013.01); *H04L 5/0007* (2013.01);
(Continued)

(58) Field of Classification Search
None
See application file for complete search history.

(56) References Cited

U.S. PATENT DOCUMENTS 7,613,104 B2 * 11/2009 Bhatt .................. H04L 27/2656
370/208
8,385,318 B2 * 2/2013 Tanno .................. H04B 1/7075
370/350
(Continued)

FOREIGN PATENT DOCUMENTS

KR   10-2005-0063590 A   6/2005
KR   10-2006-0003670 A   1/2006
(Continued)

OTHER PUBLICATIONS

International Search Report for PCT/KR2014/007589 dated Nov. 17, 2014 [PCT/ISA/210].
(Continued)

*Primary Examiner* — Steve R Young
(74) *Attorney, Agent, or Firm* — Sughrue Mion, PLLC

(57) ABSTRACT

There is provided a device for detecting LTE frame synchronization, including: a CP correlator calculating a correlation of a cyclic prefix (CP) included in each orthogonal frequency division multiplexing (OFDM) symbol of an LTE signal processed digital conversion; a frequency offset compensation unit compensating a frequency offset for a synchronization signal in the LTE signal by using a symbol frequency offset calculated based on the CP correlation; a synchronization signal correlation calculation unit performing a correlation calculation in a time domain with respect to the synchronization signal, of which the frequency offset is compensated, by considering a symbol start timing obtained based on the CP correlation; and a frame synchronization detection unit detecting the frame synchronization of the LTE signal based on a result of the correlation calculation for the synchronization signal.

16 Claims, 5 Drawing Sheets

(51) Int. Cl.
  *H04J 11/00* (2006.01)
  *H04L 27/26* (2006.01)
  *H04B 7/155* (2006.01)

(52) U.S. Cl.
  CPC ..... *H04L 27/2656* (2013.01); *H04W 56/0005* (2013.01); *H04B 7/155* (2013.01); *H04J 2211/005* (2013.01)

(56) References Cited

U.S. PATENT DOCUMENTS

| | | | |
|---|---|---|---|
| 2004/0076246 A1 | 4/2004 | Vanderperren et al. | |
| 2006/0222095 A1* | 10/2006 | Niu | H04L 27/2657 375/260 |
| 2007/0230591 A1* | 10/2007 | Choi | H04L 27/2675 375/260 |
| 2010/0296594 A1* | 11/2010 | Ko | H04L 27/2656 375/260 |
| 2011/0103534 A1* | 5/2011 | Axmon | H04J 11/0069 375/371 |
| 2011/0280176 A1* | 11/2011 | Lee | H04B 7/15507 370/315 |
| 2014/0126568 A1* | 5/2014 | Berggren | H04W 56/0015 370/350 |

FOREIGN PATENT DOCUMENTS

| | | |
|---|---|---|
| KR | 10-2006-0059667 A | 6/2006 |
| KR | 10-2006-0125941 A | 12/2006 |
| KR | 10-2010-0077984 A | 7/2010 |
| KR | 10-2011-0135579 A | 12/2011 |
| KR | 10-2012-0042138 A | 5/2012 |
| WO | 2013/056421 A1 | 4/2013 |

OTHER PUBLICATIONS

Written Opinion for PCT/KR2014/007589 dated Nov. 17, 2014 [PCT/ISA/237].

* cited by examiner

METHOD AND DEVICE FOR DETECTING LTE FRAME SYNCHRONIZATION, AND RELAY DEVICE APPLYING THE SAME

CROSS REFERENCE TO RELATED APPLICATIONS

This application is a National Stage of International Application No. PCT/KR2014/007589, filed Aug. 14, 2014, and claims priority from Korean Patent Applications No. 10-2013-0160752 filed Dec. 20, 2013, the contents of which are incorporated herein by reference in their entireties.

BACKGROUND

1. Field

The present invention relates to a method and a device for detecting frame synchronization of an LTE signal, and a relay device adopting the same.

2. Description of Related Art

In order to detect frame synchronization of an LTE system, temporal positions of a primary synchronization signal (PSS) and a secondary synchronization signal (SSS) in a frame need to be found. For example, FIG. 1 illustrates positions of the PSS and the SSS in the case of an LTE system having a time division duplexing (TDD) structure. The length of one frame is 10 ms and in this case, the PSS and the SSS are transmitted in a specific frequency band with a cycle of 5 ms. Two synchronization signals are generated with a specific sequence selected among predetermined multiple candidate sequence sets.

As the related art for detecting the frame synchronization of the LTE system, provided is a technology that detects the frame synchronization through a correlation calculation with candidate sequences of the PSS and the SSS in a frequency domain by a FFT calculation. Since the LTE system uses OFDM by a modulation scheme, the LTE system fundamentally performs the FFT calculation in order to demodulate a received signal, and as a result, it is possible to naturally detect the frame synchronization by using the PSS and the SSS during the existing FFT calculation process. However, in equipment that does not demodulate a signal like a repeater system, it is inappropriate to use the corresponding technology by a burden of the FFT calculation.

Provided is the related art that detects the frame synchronization through the correlation calculation of the PSS and the SSS in a time domain in order to solve such a disadvantage. The corresponding technology extracts bands at which the PSS and the SSS are positioned from the received signal through a low pass filter and detects the frame synchronization of the extracted PSS and SSS through the correlation calculation with the candidate sequences of the PSS and the SSS which are defined in advance. Accordingly, since the corresponding technology does not require a complicated FFT calculation, the corresponding technology has a lower calculation degree than the aforementioned technology, but the correlation calculation is continuously performed in the time domain, and as a result, the calculation degree is still high. Further, when a frequency offset is existed, it is disadvantageous in that a correlation characteristic deteriorates.

SUMMARY

An aspect of the present invention provides a method and a device for detecting LTE frame synchronization, which can easily detect frame synchronization without performing demodulation of an LTE signal.

Further, another aspect of the present invention provides a method and a device for detecting LTE frame synchronization which can significantly reduce a calculation burden at the time of detecting frame synchronization by associating a correlation calculation time of point in a time domain of a synchronization signal with a symbol synchronization timing, and a relay device applying the same.

In addition, yet another aspect of the present invention provides a method and a device for detecting LTE frame synchronization which have high reliability and accuracy by solving a correlation deterioration problem in a time domain of a synchronization signal depending on a frequency offset which occurs by a channel characteristic and a relay device applying the same.

According to an aspect of the present invention, there is provided a device for detecting long term evolution (LTE) frame synchronization, comprising: a CP correlator calculating a correlation of a cyclic prefix (CP) included in each orthogonal frequency division multiplexing (OFDM) symbol of an LTE signal processed digital conversion; a frequency offset compensation unit compensating a frequency offset for a synchronization signal in the LTE signal by using a symbol frequency offset calculated based on the CP correlation; a synchronization signal correlation calculation unit performing a correlation calculation in a time domain with respect to the synchronization signal, of which the frequency offset is compensated, by considering a symbol start timing obtained based on the CP correlation; and a frame synchronization detection unit detecting the frame synchronization of the LTE signal based on a result of the correlation calculation for the synchronization signal.

According to an embodiment, wherein the CP correlator may calculate the CP correlation by calculating a correlation between a CP positioned in a guard interval of the OFDM symbol and an end portion of the corresponding symbol and calculate a peak correlation value by continuously comparing, based on a symbol length and a CP length which are predefined, a symbol value of a specific interval as long as the CP length with a symbol value of an interval spaced apart from the symbol value of the specific interval by the symbol length.

According to an embodiment, wherein the device for detecting LTE frame synchronization may further comprise a frequency offset detection unit calculating a phase difference associated with an imaginary number component among complex number values of the CP correlation having the peak correlation value and detecting a symbol frequency offset based on the calculated phase difference, wherein the frequency offset compensation unit may compensate the frequency offset for the synchronization signal based on the symbol frequency offset detected by the frequency offset detection unit.

According to an embodiment, wherein the device for detecting LTE frame synchronization may further comprise a symbol timing detection unit determining a specific interval of a position having the peak correlation value as a CP position and detecting an OFDM symbol start timing based on the determined CP position, wherein the synchronization signal correlation calculation unit may perform the correlation calculation in the time domain for the synchronization signal according to the symbol start timing detected by the symbol timing detection unit.

According to an embodiment, wherein the device for detecting LTE frame synchronization may further comprise a symbol timing detection unit determining a specific interval of a position having the peak correlation value as a CP position and detecting an OFDM symbol start timing based on the determined CP position, wherein the synchronization signal correlation calculation unit may performs the correlation calculation in the time domain for the synchronization signal at a point where the synchronization signal is predicted to be transmitted based on the symbol start timing detected by the symbol timing detection unit.

According to an embodiment, wherein the device for detecting LTE frame synchronization may further comprise a filter passing only a frequency band corresponding to the synchronization signal in the LTE signal and a down sampler down-sampling the synchronization signal passing through the filter, wherein the frequency offset compensation unit may perform the frequency offset compensation for the synchronization signal down-sampled by the down sampler.

According to an embodiment, the synchronization signal is a primary signal (PSS) and a secondary synchronization signal (SSS) may be included in the LTE signals, and the synchronization signal correlation calculation unit may perform the correlation calculation in the time domain between the PSS and the SSS and prestored PSS and SSS candidate sequences.

According to an embodiment, wherein the frame synchronization detection unit may calculate a time position of the PSS and a time position of the SSS having the peak correlation value based on the correlation calculation result between the PSS and SSS and the prestored PSS and SSS candidate sequences and detect the frame synchronization of the LTE signal by comparing at least one of the calculated PSS time position and SSS time position with at least one of the predefined PSS position and SSS position in the LTE signal.

According to another aspect of the present invention, there is provided a relay device on which any one of the above-described device for detecting LTE frame synchronization is mounted.

According to still another aspect of the present invention, there is provided a method for detecting LTE frame synchronization in a relay device, the method comprising: calculating a correlation of a cyclic prefix (CP) included in each orthogonal frequency division multiplexing (OFDM) symbol of an LTE signal processed digital conversion; compensating a frequency offset for a synchronization signal in the LTE signal by using a symbol frequency offset calculated based on the CP correlation; performing a correlation calculation in a time domain with respect to the synchronization signal, of which the frequency offset is compensated, by considering a symbol start timing acquired based on the CP correlation; and a detecting the frame synchronization of the LTE signal based on a result of the correlation calculation for the synchronization signal.

According to an embodiment, wherein the calculating of the CP correlation may include calculating the CP correlation by calculating a correlation between a CP positioned in a guard interval of the OFDM symbol and an end portion of the corresponding symbol and calculating a peak correlation value by continuously comparing, based on a symbol length and a CP length which are predefined, a symbol value of a specific interval as long as the CP length with a symbol value of an interval spaced apart from the symbol value of the specific interval by the symbol length.

According to an embodiment, wherein the method for detecting LTE frame synchronization may further comprise calculating a phase difference associated with an imaginary number component among complex number values of the CP correlation having the peak correlation value and detecting a symbol frequency offset based on the calculated phase difference.

According to an embodiment, wherein the method for detecting LTE frame synchronization may further comprise determining a specific interval of a position having the peak correlation value as a CP position and detecting an OFDM symbol start timing based on the determined CP position.

According to an embodiment, wherein in the performing of the correlation calculation in the time domain with respect to the synchronization signal, the correlation calculation in the time domain may be performed for the synchronization signal according to the detected symbol start timing or at a point where the synchronization signal is predicted to be transmitted based on the detected symbol start timing.

According to an embodiment, wherein the synchronization signal may be a primary signal (PSS) and a secondary synchronization signal (SSS) included in the LTE signals, and in the performing of the correlation calculation in the time domain with respect to the synchronization signal, the correlation calculation in the time domain may be performed between the PSS and the SSS and prestored PSS and SSS candidate sequences.

According to an embodiment, wherein in the detecting of the frame synchronization of the LTE signal, a time position of the PSS and a time position of the SSS having the peak correlation value may be calculated based on the correlation calculation result between the PSS and SSS and the prestored PSS and SSS candidate sequences and the frame synchronization of the LTE signal may be detected by comparing at least one of the calculated PSS time position and SSS time position with at least one of the predefined PSS position and SSS position in the LTE signal.

According to an aspect of the present invention, frame synchronization can be easily detected without performing demodulation of an LTE signal.

Further, according to another aspect of the present invention, a calculation burden at the time of detecting frame synchronization can be significantly reduced by associating a correlation calculation time of point in a time domain of a synchronization signal with a symbol synchronization timing.

In addition, according to yet another aspect of the present invention, it is possible to provide a method and an device for detecting LTE frame synchronization which have high reliability and accuracy by solving a correlation deterioration problem in a time domain of a synchronization signal depending on a frequency offset which occurs by a channel characteristic and a relay device applying the same.

DETAILED DESCRIPTION OF EXEMPLARY EMBODIMENTS

Figure 1:
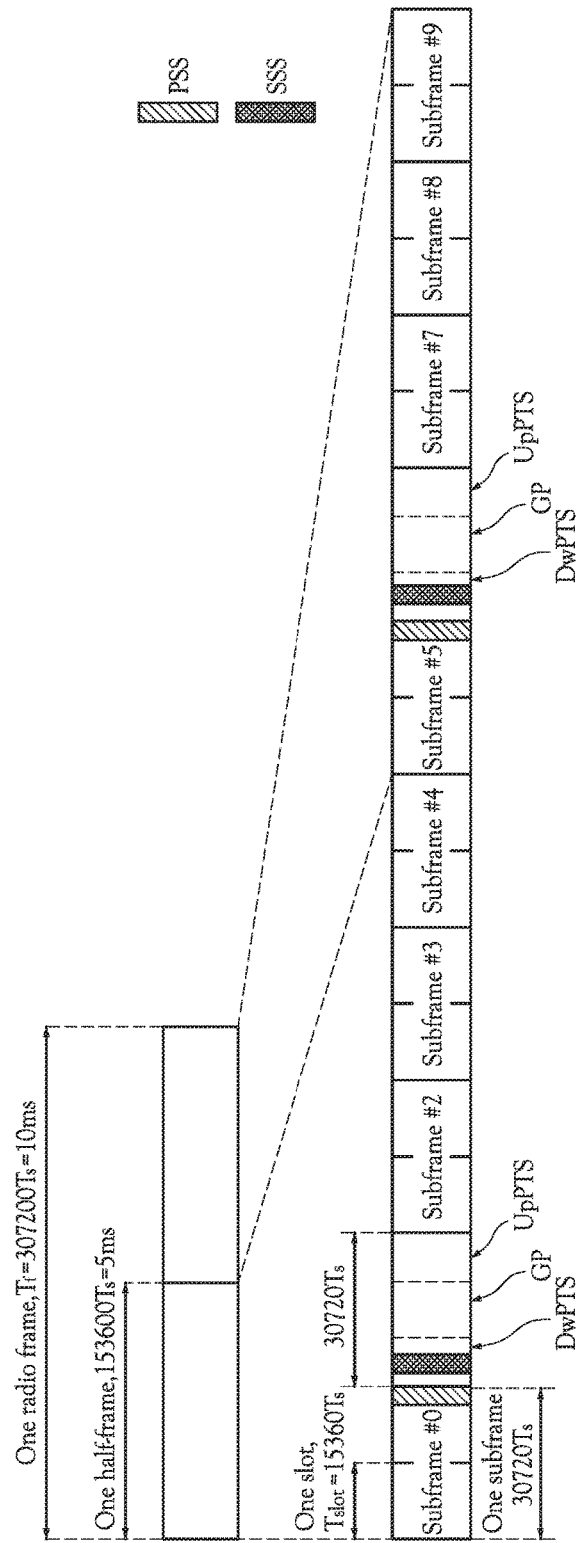
FIG. 1 is a diagram for describing positions of a PSS and an SSS in LTE TDD.

The present invention may have various modifications and various embodiments and specific embodiments will be illustrated in the drawings and described in detail in the detailed description. However, this does not limit the present invention to specific embodiments, and it should be understood that the present invention covers all the modifications, equivalents and replacements included within the idea and technical scope of the present invention. Further, in the following description, a detailed explanation of known related technologies may be omitted to avoid unnecessarily obscuring the subject matter of the present disclosure.

In describing the present invention, in the following description, a detailed explanation of known related technologies may be omitted to avoid unnecessarily obscuring the subject matter of the present invention. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

Hereinafter, a device and a method for detecting LTE frame synchronization according to embodiments of the present invention are advantageous to have a small calculation burden and high reliability and even to be applied to equipment which does not demodulates an LTE signal. The method for detecting LTE frame synchronization according to the embodiment of the present invention is described below.

In the embodiment of the present invention, as a premise for detecting the LTE frame synchronization, a correlation calculation in a time domain is performed with respect to a synchronization signal to verify a time position of the corresponding synchronization signal and verify a start time (that is, a start time of an LTE frame required for matching frame synchronization) of the LTE frame based on the verified time position of the synchronization signal.

Figure 2:
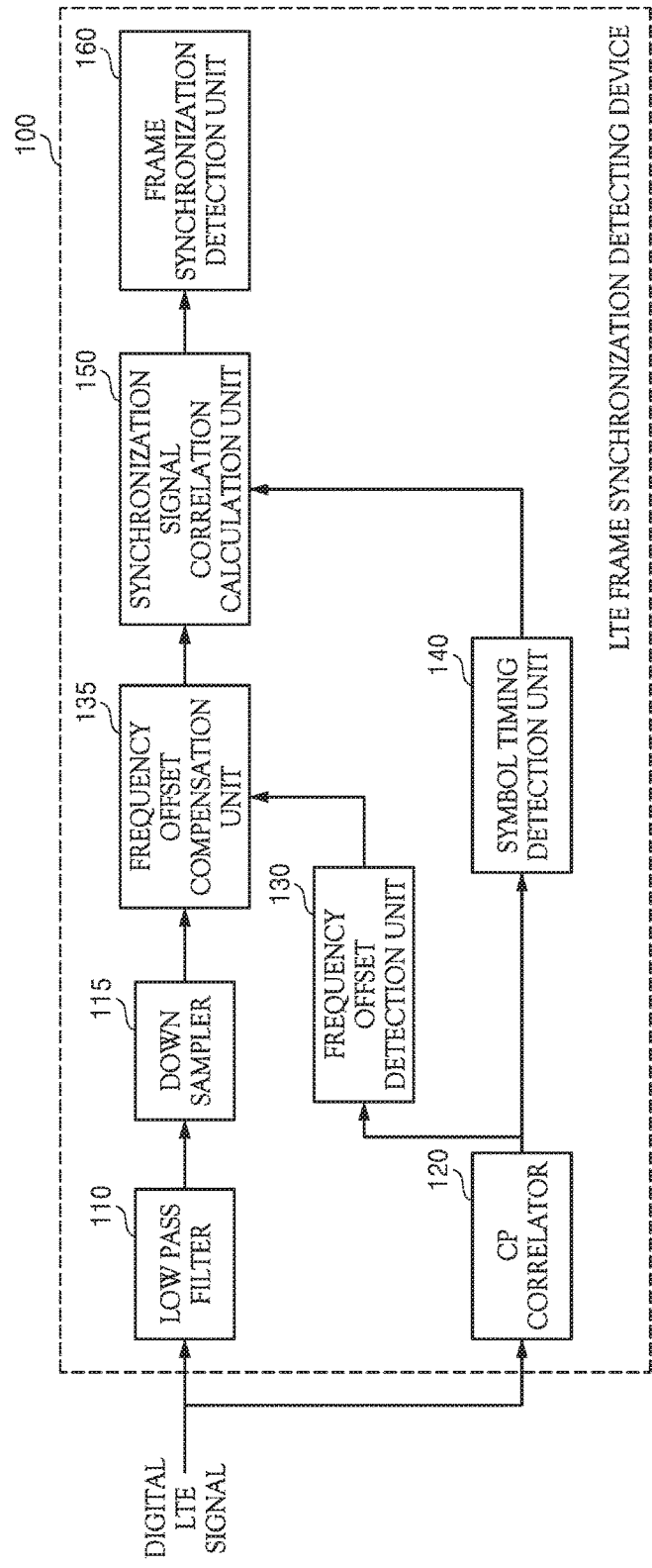
FIG. 2 is a block diagram of a device for detecting LTE frame synchronization according to an embodiment of the present invention.

To this end, in the embodiment of the present invention, prior to performing the correlation calculation in the time domain with respect to the synchronization signal, a work for compensating for a frequency variation (that is, the resulting frequency offset) which occurs by (a Doppler effect by) a channel characteristic is performed in order to increase the accuracy of the correlation calculation. This corresponds to a function of a frequency offset compensation unit 135 of FIG. 2. An amount of the frequency offset needs to be first detected according to the channel characteristic in order to compensate for the frequency offset, and as a result, the frequency offset detection unit 130 of FIG. 2 is provided. In the embodiment of the present invention, the frequency offset detection is calculated based on a correlation calculation result of a cyclic prefix (CP) included in each symbol in the LTE signal.

Further, in the embodiment of the present invention, in order to reduce the calculation burden depending on the correlation calculation in the time domain with respect to the synchronization signal, a scheme is used, which detects OFDM symbol synchronization (that is, a symbol start position (time)) based on the CP correlation calculation result and performs the correlation calculation in the time domain only at a specific point of time associated with the symbol start timing. In this case, the symbol synchronization is detected by a symbol timing detection unit 140 of FIG. 2.

Herein, the synchronization signal may be the primary signal (PSS) and the secondary synchronization signal (SSS) included in the LTE signal.

Since the method for detecting LTE frame synchronization according to the embodiment of the present invention has been described above in overall, detailed functions and roles of respective components of the LTE frame synchronization detection device 100 will be described in more detail with reference to FIGS. 3 to 5 based on a block diagram of FIG. 2.

FIG. 2 is a block diagram of a device for detecting LTE frame synchronization according to an embodiment of the present invention.

A device 100 for detecting LTE frame synchronization according to an embodiment may include a low pass filter 110, a down sampler 115, a CP correlator 120, a frequency offset detection unit 130, a frequency offset compensation unit 135, a symbol timing detection unit 140, a synchronization signal correlation calculation unit 150, and a frame synchronization detection unit 160, as illustrated in FIG. 2.

An LTE signal input into the LTE frame synchronization detecting device 100 is a digital LTE signal which is obtained by converting an original LTE signal of an RF form, that is modulated according to an orthogonal frequency division multiplexing (OFDM) scheme and transmitted with being loaded on multiple sub-carriers, into a baseband signal and thereafter, converting the baseband signal into a digital signal. Therefore, when the LTE frame synchronization detecting device 100 is mounted on a relay device as an example, an LTE signal converted into the baseband signal through a frequency down converter of the corresponding relay device and thereafter, converted into the digital signal through an analog to digital converter will be input into the LTE frame synchronization detecting device 100.

The input digital LTE signal is divided into two paths to be input into the low pass filter 110 and the CP correlator 120, respectively.

In this case, a signal path input into the low pass filter 110 is used to extract the synchronization signals (that is, the PSS and the SSS) in the input LTE signal and thereafter, perform the correlation calculation in the time domain with respect to the extracted synchronization signals. Accordingly, the low pass filter 110 may have a pass band for passing a frequency band on which the synchronization signals among the input LTE signals are loaded.

In FIG. 2, the low pass filter 110 is a component provided to pass the PSS and the SSS and filter other signals, and as a result, the low pass filter 110 may be replaced with a band pass filter as long as a function thereof may be maintained.

The down sampler 115 down-samples the synchronization signal that passes through the low pass filter 110. However, since the down sampler 115 is a component for reducing hardware calculation resources, the down sampler 115 may be omitted according to a design implementation scheme, of course.

The correlation calculation in the time domain will be afterwards performed with respect to the PSS and the SSS down-sampled through the low pass filter 110 and the down sampler 115.

Herein, since the compensation work by the frequency offset compensation unit 135 is performed based on a frequency offset value detected by the frequency offset detection unit 130, hereinafter, the CP correlation calculation work in the CP correlator 130, which is operated will be first described as a premise for the frequency offset detection unit 130 and the frequency offset detection thereof. During a description process thereof, FIGS. 3 and 4 are referred together. Herein, FIG. 3 is a diagram for describing a cyclic prefix (CP) included for each OFDM symbol and FIG. 4 is a diagram for describing an implementation example of a CP correlator and a frequency offset detection unit according to an embodiment of the present invention.

As described above, the other path of the digital LTE signal input into the LTE frame synchronization detecting device 100 is formed as a path through the CP correlator 120 (see FIG. 2).

The CP correlator 120 calculates a degree of correlation of the CP inserted every OFDM symbol of the input LTE signal. The cyclic prefix (CP) as a signal inserted into a guard interval for preventing inter-symbol interference by multi-paths in an OFDM transmission scheme is positioned at a foremost portion of each symbol as illustrated in FIG. 3. That is, in the OFDM transmission scheme, when there is no signal in the guard interval, orthogonality between sub-carriers collapses, and as a result, inter-channel interference may occur. Therefore, the CP is inserted into the guard interval. The CP is acquired by replicating a signal of the end of each symbol (see FIG. 3).

Accordingly, the CP correlator 120 calculates a CP correlation by calculating a correlation between the CP positioned in the guard interval of the OFDM symbol and a symbol signal of the end of the corresponding symbol. This is described below in detail. In the LTE signal, the length (see reference numeral D of FIG. 3, herein, D means a length except for the CP in the entire symbol, that is, means a symbol length for actual data) and the length of the CP inserted into the OFDM symbol are defined in advance. Accordingly, in regard to sequentially input signals, when a correlation value is verified, which is calculated while consecutively correlating a symbol value of a signal interval as long as a CP length (that is, a length of an interval in which the CP will be positioned) and a symbol value of a signal interval spaced apart therefrom by the symbol length D, a specific point of time (interval) showing a peak correlation value may be verified. That is, the correlation values are continuously calculated by a window sliding scheme and the correlation values are added up with respect to an interval as long as the CP length, thereby an interval at which the CP is positioned in each symbol will be detected in the manner of verifying a specific interval showing the peak correlation value among the correlation values.

Figure 4:
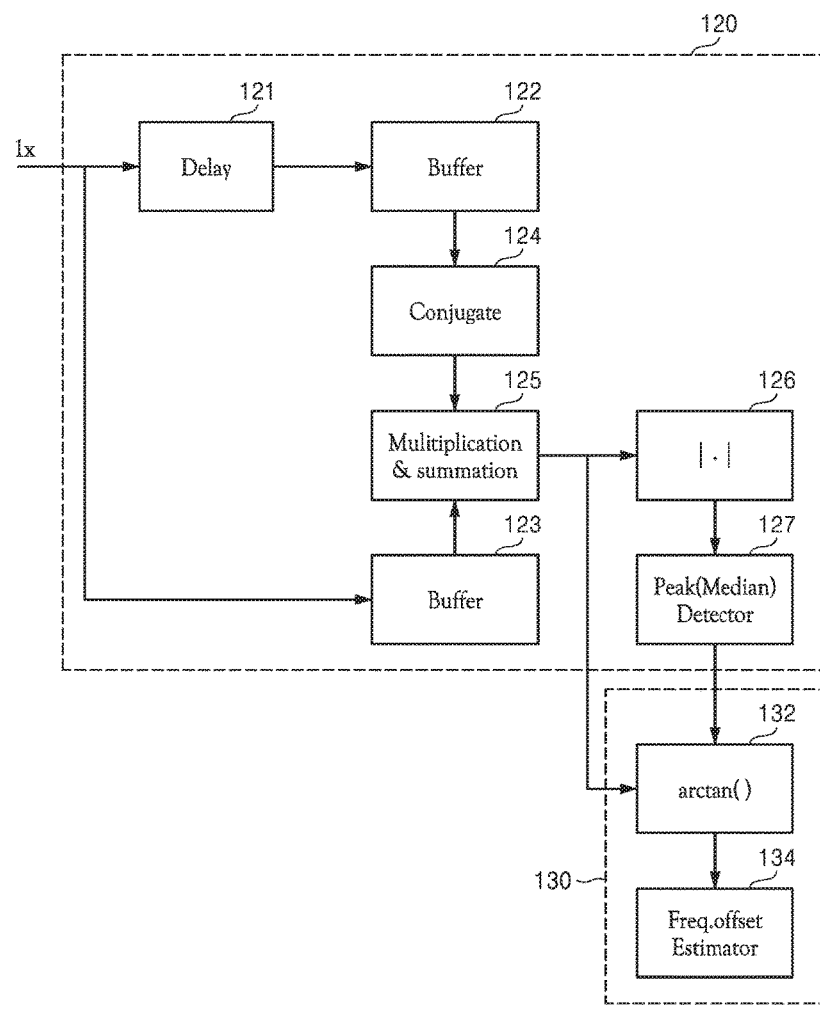
FIG. 4 is a diagram for describing an implementation example of a CP correlator and a frequency offset detection unit according to an embodiment of the present invention.

A block diagram for the CP correlation calculation is illustrated in FIG. 4. Referring to FIG. 4, in respect to the sequentially input LTE signals, a symbol value is stored in a first buffer 123 in a first path and a symbol value acquired by delaying the signal by the symbol length D through a delayer 121 is stored in a second buffer 122 in a second path. Thereafter, conjugate values (see reference numeral 124 of FIG. 4) of the symbol value stored in the first buffer 123 and the symbol value stored in the second buffer 122 are correlated and added up (accumulated) through a correlator and summer 125. By a scheme that sequentially verifies absolute values (see reference numeral 126 of FIG. 4) of the accumulated correlation values during the interval as long as the CP length, an interval in which the accumulated correlation value has a peak value (see reference numeral 127 of FIG. 4).

Figure 3:
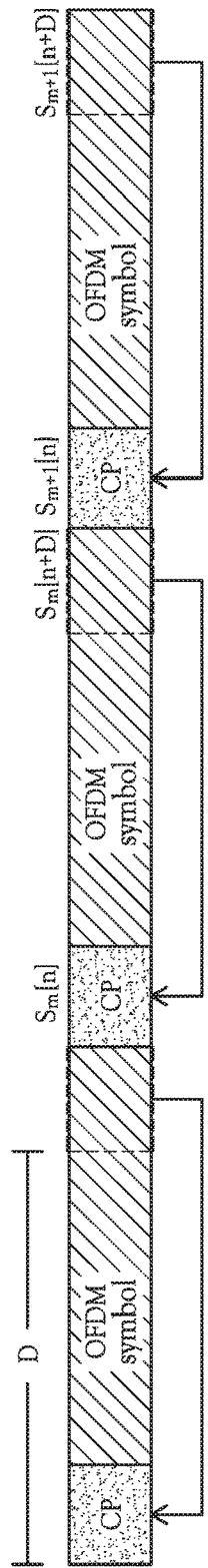
FIG. 3 is a diagram for describing a cyclic prefix (CP) included for each OFDM symbol.

The CP correlation calculation scheme is expressed by an equation 1 based on mathematical symbols of FIG. 3.

$$\sum_{n=0}^{L-1} s_m[n]s_m^*[n+D] = \sum_{n=0}^{L-1} |s_m[n]|^2 e^{-j2\pi f_o D}$$ [Equation 1]

In this case, since the CP is acquired by replicating a symbol value at the end of the symbol, when there is no phase difference between a signal at a start portion of the symbol and a signal at an end portion of the symbol (that is, when there is no signal reception delay depending on a channel environment), a CP correlation having a peak value will have only a real number value. However, when a signal delay occurs according to the channel environment (characteristic), the CP correlation having the peak value has a complex value as shown in the CP correlation calculation equation and when the CP correlation is expressed by a complex plane, a phase difference (that is, this a phase difference which is distorted between a symbol value during a CP interval at the start portion of the symbol and a symbol value of the end portion of the symbol), which occurs according to the signal delay. That is, the phase difference is associated with an imaginary number value component among complex number values calculated by the CP correlation calculation equation.

Accordingly, the frequency offset detection unit 130 of FIG. 2 may detect the phase difference generated according to the channel characteristic (the Doppler effect for the signal in the corresponding frequency band, and the like) based on the CP correlation having the complex value when the CP correlation has the peak correlation value calculated by the CP correlator 120 (see reference numeral 132 of FIG. 4) and calculate the frequency offset (symbol frequency offset) from the detected phase difference (see reference numeral 134 of FIG. 4). In this case, the frequency offset may be verified by calculating a slope between the detected phase difference and a time distance (that is, a time delay value) between the CP interval and the end portion thereof.

However, the CP correlation calculation scheme in the embodiment of the present invention is not limited to the calculation scheme illustrated in FIG. 4 and the CP correlation may be operated based on other schemes or modification schemes, of course. Further, the aforementioned frequency offset detection scheme is not also limited to the detection scheme illustrated in FIG. 4.

Further, according to the embodiment, the frequency offset detection unit 130 may determine whether the detected frequency offset is an effective result or not according to the symbol timing result detected by the symbol timing detection unit 140. As a result, although the frequency offset is detected, when the symbol timing result is not detected, since the detected frequency offset may not be an effective value, the detected frequency offset may not be used in the frequency offset compensation unit 135 afterwards.

As described above, when the frequency offset is detected, the frequency offset compensation unit 135 performs frequency offset compensation for the down-sampled PSS and SSS based on the detected symbol frequency offset. The synchronization signal correlation calculation unit 150 performs the correlation calculation in the time domain with respect to the PSS and SSS symbol values which are subjected to the frequency offset compensation. Accordingly, in the embodiment of the present invention, phase distortion (consequently, generation of the frequency offset) depending on the signal delay which occurs according to the channel characteristic is compensated to increase reliability of the correlation calculation for the PSS and SSS symbol values.

In addition, as described above, the synchronization signal correlation calculation unit 150 performs the correlation calculation in the time domain on the symbol start timing or on a specific point of time determined based on the symbol start timing by considering the symbol start timing verified through the symbol timing detection unit 140. In the related art, the correlation calculation in the time domain of the PSS and the SSS is continuously performed, while in the embodiment of the present invention, since the correlation calculation is just performed only at a specific point of time associated with the symbol start timing, the calculation burden for the correlation calculation is reduced.

The detection of the symbol start timing through the symbol timing detection unit 140 may be verified through an interval representing the peak correlation value according to the correlation calculation result of the CP correlator 120. That is, the symbol timing detection unit 140 detects the symbol start timing by verifying a symbol interval position when the CP correlation has the peak value (that is, verifies the position of the CP interval).

When the symbol start timing is detected as described above, the synchronization signal correlation calculation unit 150 calculates the correlations of the PSS and the SSS in the time domain by referring to the detected symbol start timing and in this case, the correlation calculation scheme is described below.

In general, the PSS and the SSS included in the LTE signal are selected as one of a plurality of predetermined PSS candidate sequences and one of a plurality of predetermined SSS candidate sequences, respectively. Accordingly, which sequence of PSS and SSS are selected among the received LTE signals may not be verified until demodulating the symbol value. Accordingly, in the embodiment of the present invention, is used a scheme that the predetermined PSS candidate sequence and SSS candidate sequence are stored in advance and thereafter, performs the correlation calculation in the time domain with respect to the PSS and SSS extracted from the LTE signals input into the LTE frame synchronization detecting device 100 with the prestored PSS candidate sequence and SSS candidate sequence symbol to symbol. Since the correlation calculation of the PSS and the SSS is not continuously performed but is performed only at the detected symbol start timing, the calculation burden may be reduced.

For example, when a total of three predefined PSS candidate sequences, a total of 168 SSS candidate sequences, and a total of 504 PSS-SSS combinations are present, correlations of synchronization signals (this is a symbol value before demodulation, and as a result, it is impossible to verify which is the PSS or the SSS) extracted by the low pass filter 110 and temporally sequentially input with the total of 3 PSS candidate sequences are first operated. According to the correlation calculation result, one specific PSS candidate sequence (that is, this is the PSS sequence used for the LTE signal) having the correlation of the peak value among the three PSS candidate sequences may be verified and in which time interval the synchronization signal having the correlation of the peak value in the relationship with the PSS candidate sequence is positioned may be verified. Thereafter, by the same scheme, in which signal interval the SSS among the LTE signals is positioned may be verified according to the correlation calculation result between the input synchronization signal and the SSS candidate sequence.

Accordingly, the frame synchronization detection unit 160 of the LTE frame synchronization detecting device 100 may detect the frame synchronization of the LTE signal by using the aforementioned scheme. That is, the frame synchronization detection unit 160 calculates a time position of the PSS and a time position of the SSS having the peak correlation value in the time domain based on the correlation calculation result between the PSS and SSS extracted from the input LTE signals and the prestored PSS candidate sequence and SSS candidate sequence and detects the frame synchronization by comparing at least one of the calculated PSS time position and SSS time position with at least one of the predefined PSS position and SSS position in the LTE signals.

Figure 5:
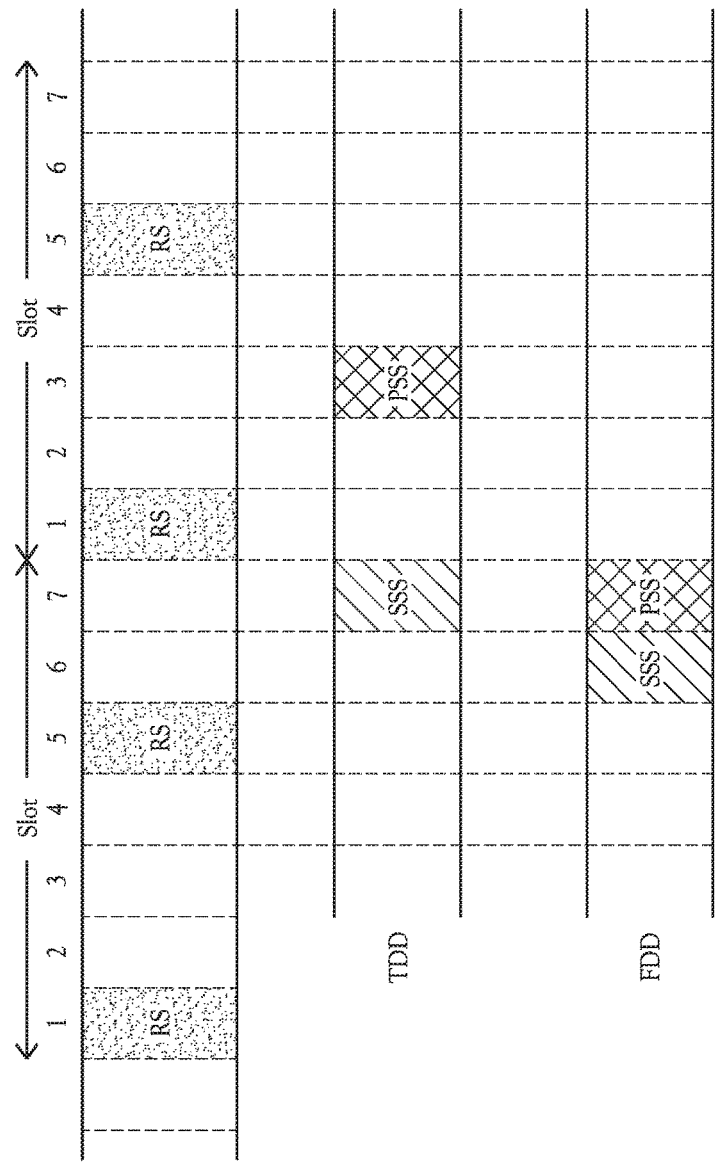
FIG. 5 is a diagram illustrating an example for describing positions of a PSS and an SSS associated with a position of a reference signal (RS) symbol.

As verified through FIGS. 1 and 5, the reason is that since positions of the PSS and the SSS inserted into the LTE signal are predetermined according to a TDD structure or an FDD structure and further, a deployment interval between the PSS position and the SSS position is also predetermined, when any one of the PSS time position and the SSS time position having the peak correlation value in the time domain is known, the LTE frame synchronization (that is, a point of time when the frame starts) may be detected according to the TDD or FDD structure. Herein, FIG. 5 is a diagram illustrating an example for describing positions of a PSS and an SSS associated with a position of a reference signal (RS) symbol in a TDD or FDD structure. Referring to FIG. 5, it may be verified that the positions of the synchronization signals (that is, the PSS and the SSS) are fixed based on an RS transmission interval according to a frame type.

In the aforementioned described, a case is described, in which the synchronization signal correlation calculation unit 150 performs the correlation calculation in the time domain of the PSS and the SSS on the symbol start timing (that is, every symbol start timing). However, the synchronization signal correlation calculation unit 150 may perform the correlation calculation in the time domain at a predetermined time interval from the symbol start timing. Referring to FIG. 5 in which the PSS and SSS insertion positions are determined based on the RS transmission interval as an example, the correlation calculation is not performed immediately in the RS transmission interval which is the symbol start timing but the correlation calculation may be performed at last at the time positions (that is, a time position at which the synchronization signal is expected to be transmitted after transmitting the RS symbol) into which the PSS and the SSS are inserted based on the RS transmission interval. Such a scheme is efficient in the case where a data load is small in the LTE signal.

The present invention has been described with reference to the embodiments of the present invention. However, it will be appreciated by those skilled in the art that various modifications and changes of the present invention can be made without departing from the spirit and the scope of the present invention which are defined in the appended claims and their equivalents.

What is claimed is:

1. A device for detecting long term evolution (LTE) frame synchronization, comprising:
   a cyclic prefix (CP) correlator configured to calculate a CP correlation between an LTE signal and a delayed LTE signal based on a first symbol value of the LTE signal and a second symbol value of the delayed LTE signal, wherein the delayed LTE signal is obtained by delaying the LTE signal, and each orthogonal frequency division multiplexing (OFDM) symbol of the LTE signal includes a CP;
a frequency offset detector configured to detect a symbol frequency offset of the LTE signal based on the CP correlation;
a symbol timing detector configured to detect a symbol start timing of the LTE signal based on the CP correlation;
a synchronization signal extractor configured to extract a synchronization signal from the LTE signal;
a frequency offset compensator configured to compensate for a frequency offset of the synchronization signal based on the detected symbol frequency offset;
a synchronization signal correlator configured to predict a specific time point at which the synchronization signal is transmitted based on the symbol start timing, and calculate a correlation between the synchronization signal in which the frequency offset is compensated for and a candidate synchronization signal, in a time domain, only at the predicted specific time point; and
a frame synchronization detector configured to detect a frame synchronization of the LTE signal based on the correlation calculated at the specific time point.

2. The device for detecting LTE frame synchronization of claim 1, wherein the delayed LTE signal is obtained by delaying the LTE signal for a time corresponding to an interval of the OFDM symbol, and
wherein the CP correlator is further configured to calculate the CP correlation by correlating the LTE signal and the delayed LTE signal during a time corresponding to an interval of the CP.

3. The device for detecting LTE frame synchronization of claim 1, wherein the frequency offset detector is further configured to calculate a phase difference between the LTE signal and the delayed LTE signal based on an imaginary number of a peak value of the CP correlation, and detects the symbol frequency offset based on the phase difference.

4. The device for detecting LTE frame synchronization of claim 1, wherein the symbol timing detector is further configured to determine an interval corresponding to a peak value of the CP correlation as a position of the CP, and detects the symbol start timing based on the position of the CP.

5. The device for detecting LTE frame synchronization of claim 1, wherein the synchronization signal correlator is configured to predict the specific time point including a first specific time point corresponding to the symbol start timing or a second specific time point which is determined based on the symbol start timing.

6. The device for detecting LTE frame synchronization of claim 1, further comprising:
a down sampler configured to perform down-sampling on the synchronization signal that is extracted by the synchronization signal extractor,
wherein the frequency offset compensator compensates for the frequency offset of the synchronization signal that is down-sampled by the down sampler.

7. The device for detecting LTE frame synchronization of claim 1, wherein
the synchronization signal includes a primary synchronization signal (PSS) and a secondary synchronization signal (SSS) included in the LTE signal, and
the candidate synchronization signal includes prestored PSS candidate sequences and SSS candidate sequences.

8. The device for detecting LTE frame synchronization of claim 7, wherein the frame synchronization detector is further configured to detect a position of the PSS based on a peak value in a correlation between the PSS and the prestored PSS candidate sequences, detect a position of the SSS based on a peak value in a correlation between the SSS and the prestored SSS candidate sequences, and detect the frame synchronization of the LTE signal by comparing at least one of the PSS position and SSS position with at least one of a predefined PSS position and SSS position.

9. A relay device on which the device for detecting LTE frame synchronization of claim 1 is mounted.

10. A method for detecting LTE frame synchronization in a relay device, the method comprising:
calculating a cyclic prefix (CP) correlation between an LTE signal and a delayed LTE signal based on a first symbol value of the LTE signal and a second symbol value of the delayed LTE signal, wherein the delayed LTE signal is obtained by delaying the LTE signal, and each orthogonal frequency division multiplexing (OFDM) symbol of the LTE signal includes a CP;
detecting a symbol frequency offset of the LTE signal based on the CP correlation;
detecting a symbol start timing of the LTE signal based on the CP correlation;
extracting a synchronization signal from the LTE signal;
compensating for a frequency offset of the synchronization signal based on the detected symbol frequency offset;
predicting a specific time point at which the sychronization signal is transmitted based on the symbol start timing;
calculating a correlation between the synchronization signal in which the frequency offset is compensated for and a candidate synchronization signal, in a time domain, only at the predicted specific time point; and
detecting a frame synchronization of the LTE signal based on the correlation calculated at the specific time point.

11. The method for detecting LTE frame synchronization of claim 10, wherein the delayed LTE signal is obtained by delaying the LTE signal for a time corresponding to an interval of the OFDM symbol, and
the calculating of the CP correlation includes calculating the CP correlation by correlating the LTE signal and the delayed LTE signal during a time corresponding to an interval of the CP.

12. The method for detecting LTE frame synchronization of claim 10, wherein the detecting of the symbol frequency offset includes calculating a phase difference between the LTE signal and the delayed LTE signal based on an imaginary number of a peak value of the CP correlation, and detecting the symbol frequency offset based on the phase difference.

13. The method for detecting LTE frame synchronization of claim 10, wherein the detecting of the symbol start timing includes
determining an interval corresponding to a peak value of the CP correlation as a position of the CP; and
detecting the symbol start timing based on the position of the CP.

14. The method for detecting LTE frame synchronization of claim 10, wherein the predicted specific time point includes a first specific time point corresponding to the symbol start timing or a second specific time point which is determined based on the symbol start timing.

15. The method for detecting LTE frame synchronization of claim 10, wherein the synchronization signal includes a primary synchronization signal (PSS) and a secondary synchronization signal (SSS) included in the LTE signal, and the candidate synchronization signal includes prestored PSS candidate sequences and SSS candidate sequences.

16. The method for detecting LTE frame synchronization of claim 15, wherein the detecting of the frame synchronization of the LTE signal includes detecting a position of the PSS based on a peak value in a correlation between the PSS and the prestored PSS candidate sequences and detecting a position of the SSS based on a peak value in a correlation between the SSS and the prestored SSS candidate sequences; and detecting the frame synchronization of the LTE signal by comparing at least one of the PSS position and SSS position with at least one of a predefined PSS position and SSS position.

* * * * *